(12) United States Patent
Page et al.

(10) Patent No.: US 7,165,070 B2
(45) Date of Patent: Jan. 16, 2007

(54) INFORMATION RETRIEVAL SYSTEM

(75) Inventors: David Richard Page, Romsey (GB); Birgit Schmidt-Wesche, Winchester (GB); Jonathan Stone, Romsey (GB)

(73) Assignee: International Business Machines Corporation, Armonk, NY (US)

( * ) Notice: Subject to any disclaimer, the term of this patent is extended or adjusted under 35 U.S.C. 154(b) by 1107 days.

(21) Appl. No.: 09/877,152

(22) Filed: Jun. 8, 2001

(65) Prior Publication Data

US 2002/0143864 A1  Oct. 3, 2002

(30) Foreign Application Priority Data

Mar. 30, 2001 (GB) .............................................. 0107953

(51) Int. Cl.
*G06F 17/30* (2006.01)

(52) U.S. Cl. ............................................. 707/10; 707/3

(58) Field of Classification Search ...................... 707/1, 707/2, 3, 10, 100, 101, 102, 513
See application file for complete search history.

(56) References Cited

U.S. PATENT DOCUMENTS 5,937,163 A * 8/1999 Lee et al. .................... 709/218
6,144,962 A * 11/2000 Weinberg et al. ............. 707/10
6,493,717 B1 * 12/2002 Junkin ........................ 707/102

* cited by examiner

*Primary Examiner*—Diane D. Mizrahi
(74) *Attorney, Agent, or Firm*—Duke W. Yee; A. Bruce Clay; Richard J. Mowra

(57) ABSTRACT

A method of retrieving information by navigating within a web browsing session. The information is stored on a server in a hierarchical tree comprising a root node, top-level child nodes representing information categories and leaf nodes representing information sub-categories. Each of the nodes has an associated information unit. Initially, an information unit associated with the root node is displayed in an information space. A user then performs navigation operations from the root node, by selecting a first top-level child node, traversing the leaf nodes and selecting a first leaf node. A first information unit associated with the first leaf node is subsequently displayed in the information space. This first information unit is stored, the navigation operations are repeated on a second top-level child node until a second information unit is displayed in the information space. The user then re-selects the first top-level child node and in response to the re-selection the first information unit is automatically re-displayed in the information space.

36 Claims, 14 Drawing Sheets

| | 720 | 730 | 740 | 750 |
|---|---|---|---|---|
| "Tasks" | CICS task groups | task nav html | task home html |
| "Concepts" | ----- --- | --- - --- | ---- ----- |
| "Reference" | ------ ----- | ------ ---- | --- -------- - |
| "Help" | --- ------ -- | ----- ---- --- | --- ---- - |

```
var Category = new Array();              // Declare the array
                                         //   category
var currentCategory = 0;                 // The currently displayed
                                         // category - initially
                                         // the "Tasks" category function defineCategory (name,desc,navURL,URL)  // The array
constructor
{
this.name   = name;       // The name of the category this.desc    = desc;    // The description of the category for the
                            // window status area
    this.navURL  = navURL;  // The URL of the navigation HTML file
    this.URL     = URL;     // The URL of the introductory information
                            //   unit
}
// Initialise the array:

Category[0] = new defineCategory ('Tasks',
                            'CICS task groups',
                                'tasknav.html',
                                    'taskhome.html');
Category[1] = new defineCategory ('Concepts',
                            'CICS concepts',
                                'conceptnav.html',
                                    'concepthome.html');
Category[2] = new defineCategory ('Reference',
                            'Reference information',
                                'refnav.html',
                                    'refhome.html');
Category[3] = new defineCategory ('Help',
                            'Help',
                                'helpnav.html',
                                    'helphome.html');
```

FIG. 8A

```
// Define the category tabs for (categoryNumber=0; categoryNumber<Category.length;
categoryNumber++)
{
    tab = '<a id="B' + categoryNumber + '"'
        + ' category="tab"'
        + ' href="' + Category[categoryNumber].navURL + '"'
        + ' target="nav"'
        + '
onMouseOver="window.status=\''+category[categoryNumber].desc+'\';'
                    +'return true;"'
        + ' onClick="switchCategory (categoryNumber);return true;"'
        + '>' + category[categoryNumber].name + '</a>';
    document.writeln(tab);
}
```

FIG. 8B

```
// Switch from the current category to a new category function switchCategory (newCategory)
{
Category[currentCategory].URL = main.location.href;  // Save the
                                                     // currently
                                                     // displayed
                                                     // information
                                                     // unit main.location.href = Category[newCategory].URL;  // Redisplay main
                                                     // panel switchColours(currentCategory,newCategory);      // Change
                                                     // category tab
                                                     // colours currentCategory = newCategory;                   // Remember
                                                     // current
                                                     // category
}
```

FIG. 8C

INFORMATION RETRIEVAL SYSTEM

TECHNICAL FIELD OF THE INVENTION

The present invention relates to information retrieval in an information network and more particularly, navigating the World Wide Web during a web browsing session.

BACKGROUND OF THE INVENTION

The World Wide Web is the Internet's multimedia information retrieval system. In the Web environment, client machines communicate with Web servers using the Hypertext Transfer Protocol (HTTP). The web servers provide users with access to files such as text, graphics, images, sound, video, etc., using a standard page description language known as Hypertext Markup Language (HTML). HTML provides basic document formatting and allows the developer to specify connections known as hyperlinks to other servers and files. In the Internet paradigm, a network path to a server is identified by a Uniform Resource Locator (URL) having a special syntax for defining a network connection. So called web browsers, for example, Netscape Navigator (Netscape Navigator is a registered trademark of Netscape Communications Corporation) or Microsoft Internet Explorer, which are applications running on a client machine, enable users to access information by specification of a link via the URL and to navigate between different HTML pages.

FIG. 1 shows an example of typical a web browser graphical user interface ("GUI") display on a browser computer. On a portion (100) of a user's computer display, a web browser (110), in this example Netscape Navigator, runs in its own window. In this example, the web browser is currently pointed to the top-level or home page of the example web site, as indicated by the URL http://www.corp.com in the location bar (140). This web page, "index.htm", is configured to split the GUI display into three frames. The upper frame (120) is used to display a general banner, the left frame (130) is used to display a list of hyperlinks from the top-level web page (or navigation bar), and the right bottom frame (150) displays the contents of the currently selected web page. The top of the web browser display includes a row of control icons, including a "back" button (160) and a "forward" button (170). Additionally, a domain history button (180) provides a drop down history list of the URLs of web sites most recently visited by the browser application.

When the user of the web browser selects a link, the client issues a request to a naming service to map a hostname (in the URL) to a particular network IP (Internet Protocol) address at which the server is located. The naming service returns an IP address that can respond to the request. Using the IP address, the web browser establishes a connection to a server. If the server is available, it returns a web page. To facilitate further navigation within the site, a web page typically includes one or more hypertext references known as "anchors" or "links".

In FIG. 2, a typical tree-like hierarchical organisation of links within a web site is shown, where a given link (200) typically points to other Web resources (210, 215), and those resources may point to still other resources (220,222,224, 226,228). Thus, a given top-level link often has an associated set of lower level links, which may point to still more resources located across many different servers in the network. Navigation through multiple levels of links is often very difficult. The goal of many users of the Internet is to "drill down" to a given piece of information that represents some desired content. Because HTML pages are often statically coded, however, a user often has little choice but to load successive web pages in search of a given web page that might hold the content of interest. This approach is time consuming, and it often results in the user either terminating the navigation of a particular site or simply not finding the relevant content. Additionally, when traversing these multiple levels of links, the user often loses track of the sequence of links used to arrive at a particular web page of interest. Thus, the user could have difficulty in returning to a particular web page after further web pages have been subsequently browsed, if it were necessary to repeat the process of traversing the multiple levels to find that particular web page again.

A bookmark facility is one way of addressing this problem by providing a mechanism to store and recall specific web pages of interest. Each bookmark comprises the title of the web page and the URL used to access the web page. Additionally, bookmarks often contain the date on which the web page was last visited and the date on which the web page was book-marked, along with additional information.

Another approach to this navigation problem is provided by built-in navigation functions in currently available web browsers, which use the history log and allow users to revisit previously opened web pages. A "back" button, such as button 160, backtracks the user's browsing sequence one web page at a time to show the previous web page. After the user has returned to a previous web page, the "forward" button, such as button 170, is enabled, allowing the user to browse to the forward-most web page in the user's browsing sequence. Sometimes, a user may descend multiple layers into a web site in such a way that the "back" button must be clicked several times to return to the top-level web page.

While the bookmark and backtracking tools give the user certain limited flexibility in revisiting web pages, the tools limit the user to a single branch in the browsing path. Thus, there is a need for a user to be able to revisit web pages with fewer mouse clicks and also revisit web pages within multiple branches in the browsing path.

FIG. 3 shows another approach that enables the user to keep his or her place in a tree of information, that is, the conventional built-in web browser function of opening multiple web browser windows. Therefore, if a particular first web page (300) is opened within a first web browser window (310) and the user then opens a second web browser window (330) to view a second web page (320), the first web page (300) can be retrieved for viewing by re-selecting the first web browser window (310). However, this has the disadvantage of requiring an extra web browser window to be opened which is time-consuming, an extra overhead and also clutters the screen display. Thus, there is a need for a user to be able to keep their place in a tree of information within a single web browser window.

U.S. patent application Ser. No. 09/310914, filed May 13, 1999 discloses a method and apparatus for implementing direct link selection of cached, previously visited links in nested web pages. A pointer is added to each web page identifier, which points to the previous linking web page in the navigational path. Another pointer may be added to each web page identifier, which points to the next linking web page in the navigational path. The web browser is thereby enabled to store and display information regarding a navigational path for accessing linking network node addresses.

U.S. patent application Ser. No. 09/210198, filed Dec. 10, 1998, discloses a recursive link navigation interface method.

More specifically, a link map associated with a parent link in a web page is built using a client-side or server-side process. The link map, which includes URLs, text descriptors or actual thumbnail web page images, is selectively displayed at a client web browser when a user takes a given action with respect to the parent link. Thus, for example, when the user hovers over the link with a mouse operation, the link map is displayed to enable the user to determine whether further navigation (through the parent link) is desirable. While the link map is displayed, the user may, alternatively, jump to another link (in the link map) without first traversing the parent and (perhaps other) subordinate links.

U.S. patent application Ser. No. 09/687091, filed Oct. 10, 2000, discloses a method for browser history thread sibling management. The user may use the conventional "back" and "forward" buttons to traverse backwards and forwards within a browsing history thread, respectively, as well as use the "UP" and "DOWN" keys to traverse to the next and previous sibling browsing history threads, respectively.

U.S. patent application Ser. No. 09/704596, filed Nov. 3, 2000, discloses a multidimensional browser visual history thread viewer. A user may visually review multiple visual browsing history sessions in a two-dimensional array, or panel, of visual history viewers. The user may select a multidimensional visual history review tool, which causes an array of pop-up viewers to be displayed, each replaying a different web browser visual history session, simultaneously.

Thus, there is a need to be able to store the web page that is currently being displayed, so that when a user chooses another navigation path and arrives at a different web page, it is possible to switch between the web pages contained within different navigation paths, with ease.

SUMMARY OF THE INVENTION

Accordingly, in a first aspect, the present invention provides a method of retrieving information by navigating within a web browsing session, in which the information is stored in a hierarchical tree comprising a root node, a plurality of top-level child nodes representing information categories, and a plurality of leaf nodes, each of said nodes having an associated information unit, said method comprising the steps of: displaying an associated information unit of the root node in an information space; performing navigation operations from the root node, by selecting a first of said plurality of top-level child nodes, traversing said plurality of leaf nodes and selecting a first of said plurality of leaf nodes; in response to said performing step, displaying a first associated information unit of said first of said plurality of leaf nodes in said information space; storing said first associated information unit; repeating each of said performing step, said displaying step and said storing step, for a second of said plurality of top-level child nodes whereby a second associated information unit is displayed in said information space; re-selecting said first of said plurality of top-level child nodes, and in response to said re-selecting step, automatically re-displaying said first associated information unit in said information space.

Preferably, the nodes are selected by clicking on an associated icon. Preferably, the first associated information unit is re-displayed by clicking once on an associated icon of the first of said plurality of top-level child nodes. Preferably, a selected associated icon changes colour and presentation characteristics of the associated information units are obtained from a style sheet.

In a preferred embodiment of the present invention, the root node and each of the plurality of top-level child nodes has an associated navigation tree, whereby the navigation tree has information links that are expandable from a closed to an expanded state. Preferably, the state of a navigation tree is stored upon closing of the navigation tree and is restored upon opening of the navigation tree. Preferably, the state of a navigation tree is stored on a client computer.

Preferably, data associated with the root node and each of the plurality of top-level child nodes is stored as items in an array. For one of the nodes, the data comprises: text associated with the one node; a network address associated with a navigation tree for the one node, and a network address associated with a first associated information unit returned by traversing through the one node.

Preferably, the information is organised as an information center of a collection of online documents, whereby the information center comprises an upper frame containing the associated icons, a left frame containing a navigation tree and a right bottom frame containing the information space. Preferably, the information center is structured in two dimensions.

In a second aspect, the present invention provides a computer program comprising instructions which when executed on a computer cause said computer, in response to user inputs, to carry out the method as described above.

In a third aspect, the present invention provides a client computer for retrieving information by navigating within a web browsing session, whereby said client is connected via a network to a server in which the information is stored in a hierarchical tree comprising a root node, a plurality of top-level child nodes representing information categories, and a plurality of leaf nodes, each of said nodes having an associated information unit, said client computer comprising: means for displaying an associated information unit of the root node in an information space; means for performing navigation operations from the root node, by selecting one of said plurality of top-level child nodes, traversing said plurality of leaf nodes and selecting one of said plurality of leaf nodes; means, responsive to selection of said one of said plurality of leaf nodes, for displaying an associated information unit of said one of said plurality of leaf nodes in said information space; means for storing said associated information unit; means, responsive to re-selection of said one of said plurality of top-level child nodes, for automatically re-displaying said associated information unit in said information space, notwithstanding the intervening selection by said means for performing navigation of a different one of said plurality of top-level child nodes.

In a fourth aspect, the present invention provides a system for retrieving information by navigating within a web browsing session, comprising: a client as described above and a server having means for storing the information in a hierarchical tree comprising a root node, a plurality of top-level child nodes representing information categories, and a plurality of leaf nodes, each of said nodes having an associated information unit, whereby said server is responsive to receiving inputs from the client to provide an associated information unit on selection of one of said nodes.

BRIEF DESCRIPTION OF THE DRAWINGS

The present invention will now be described, by way of example only, with reference to preferred embodiments thereof, as illustrated in the following drawings:

FIG. 7 shows a representation of an array, whereby information related to a top-level category is stored as items in the array, according to the present invention;

FIG. 8A shows an example of the declaration and initialisation of the array, according to the present invention;

FIG. 8B shows an example of the definition of top-level category tabs, according to the present invention, and FIG. 8C shows an example of a function, which is invoked when a user switches between top-level categories.

DETAILED DESCRIPTION OF THE PREFERRED EMBODIMENT

Figure 4:
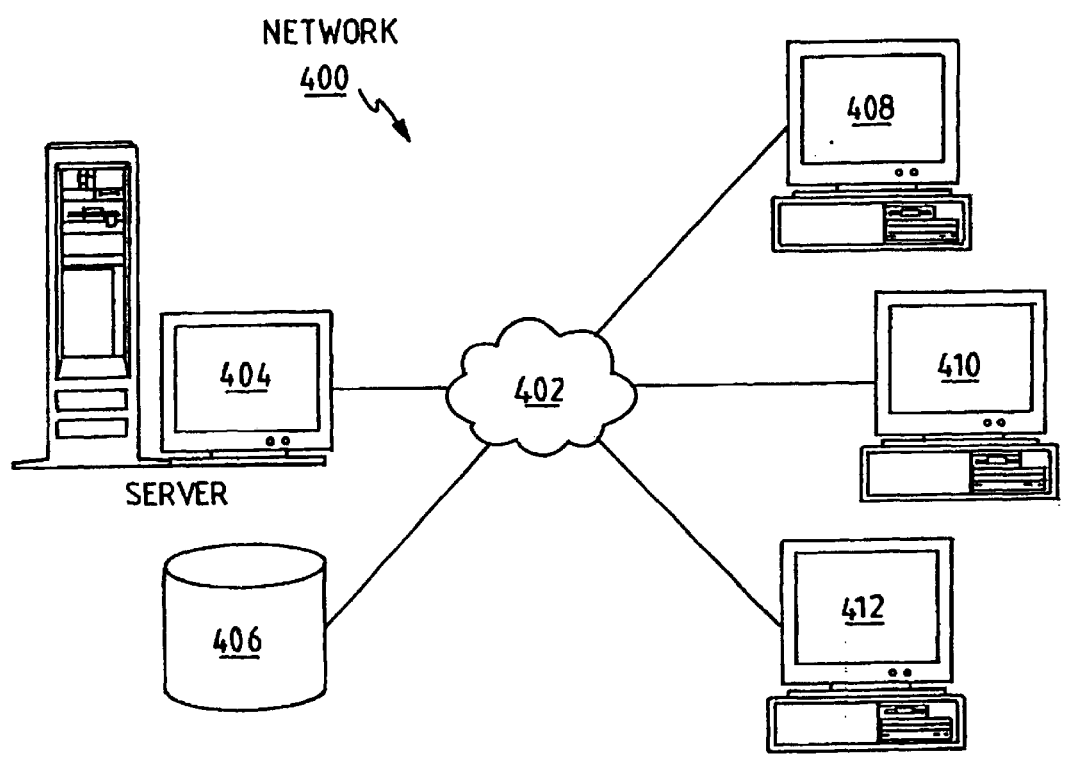
FIG. 4 shows a prior art distributed data processing system in which the present invention may be implemented.

FIG. 4 shows a pictorial representation of a distributed data processing system in which the present invention may be implemented. Distributed data processing system 400 comprises a number of computers, connected by a network 402. Server 404 is connected to network 402 along with storage unit 406 and clients 408, 410 and 412. In the depicted example, distributed data processing system 400 is the Internet, with network 402 representing a world-wide collection of networks and gateways that use the transmission control protocol over internet protocol (TCP/IP) suite of protocols to communicate with one another.

In a preferred embodiment of the present invention, an improved information center is described. Information centres are online collections of documents based on HTML web browsers. The information centres provide easy access to large libraries of softcopy information about particular products, such as help and support information, via a simple interface.

Figure 1:
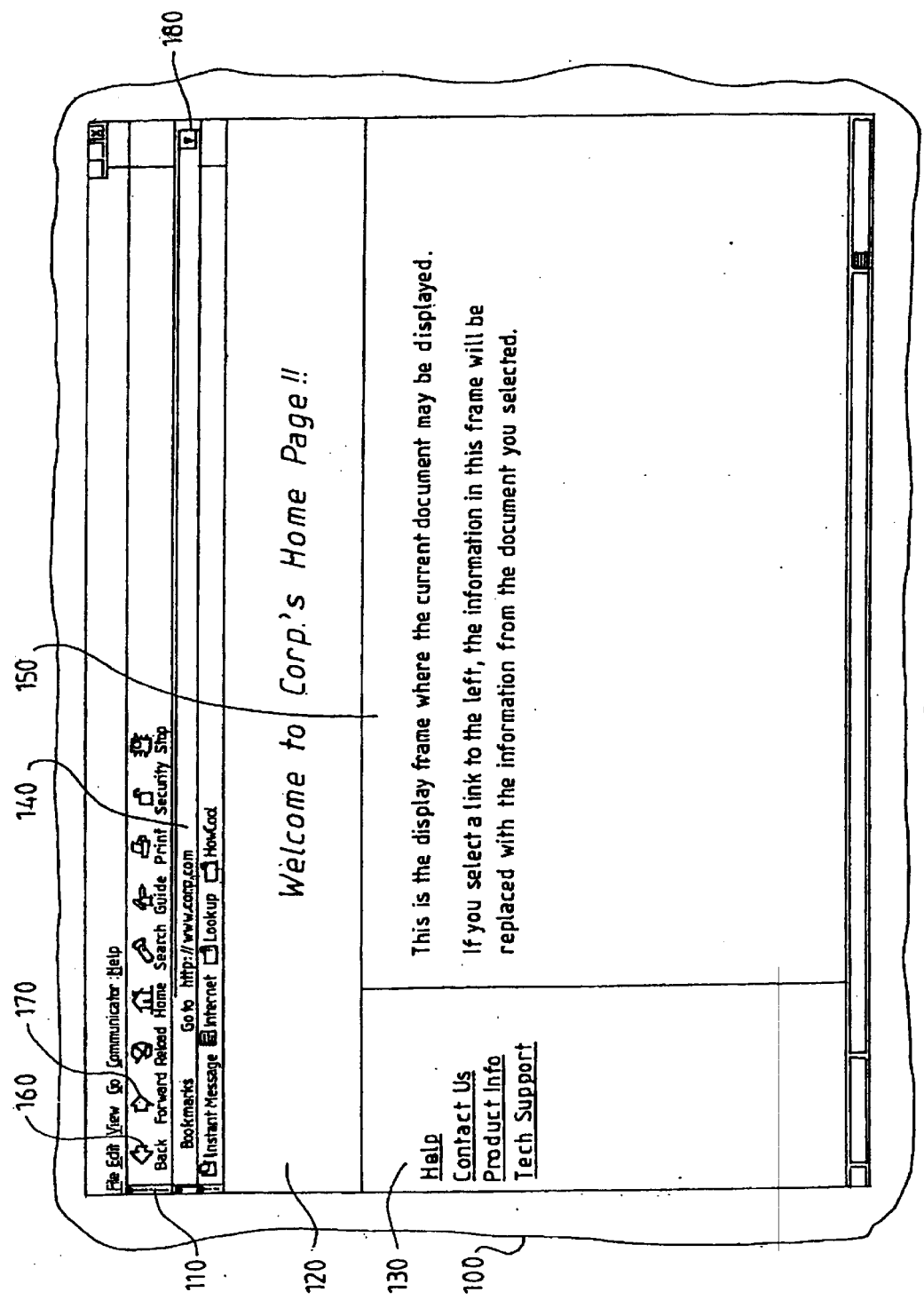
FIG. 1 shows a prior art example of display in a typical web browser graphical interface window.
Figure 2:
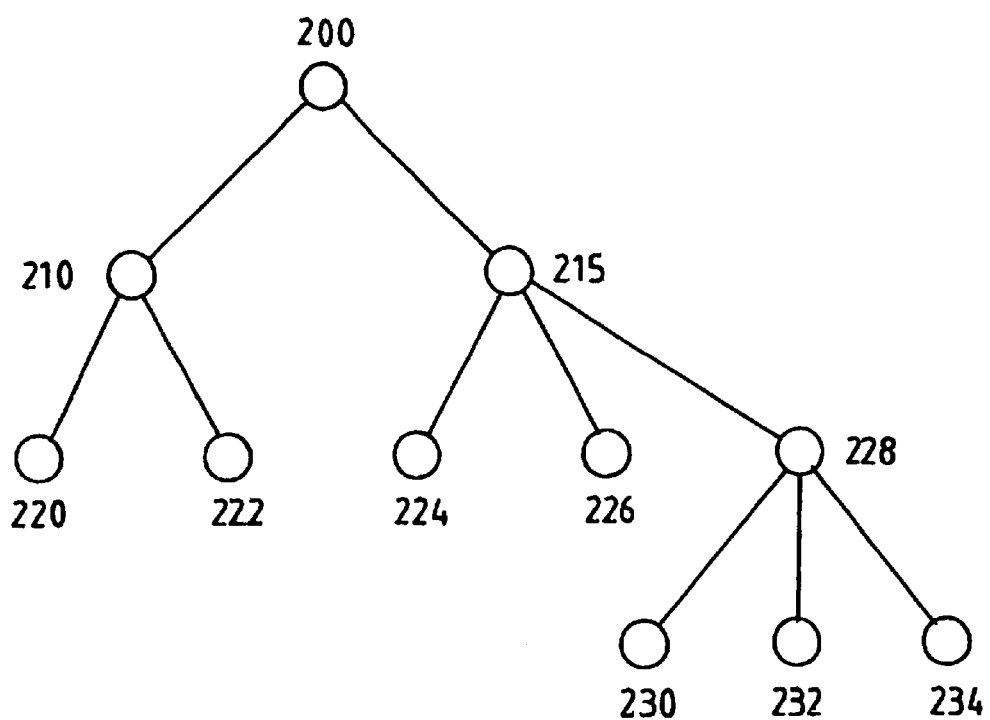
FIG. 2 shows a prior art tree structure of hyperlink relationships.
Figure 3:
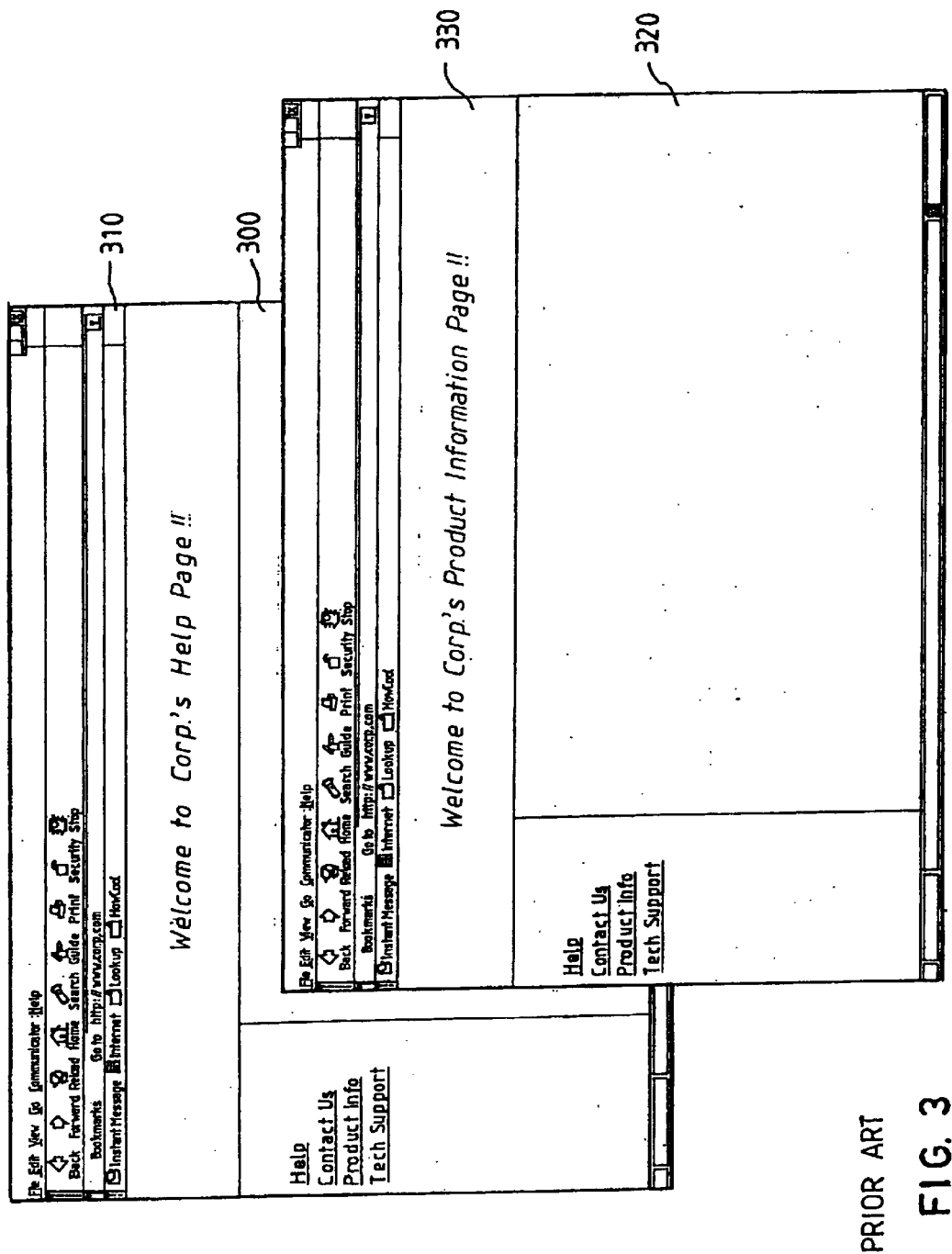
FIG. 3 shows a prior art technique for displaying multiple web browser windows.
Figure 5A:
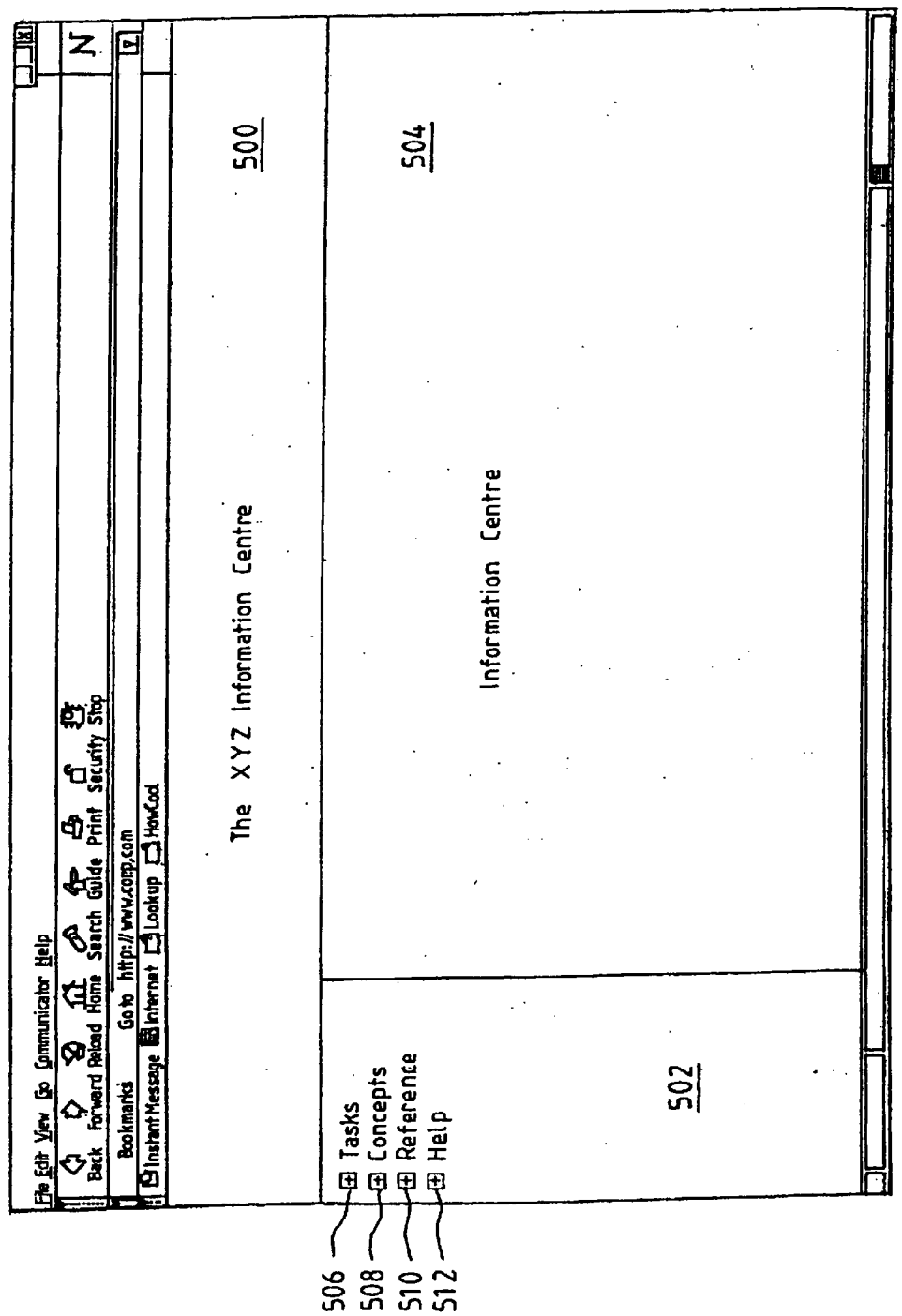
FIG. 5A shows a prior art information center.

FIG. 5A shows a typical interface of a current information center, which is supported by a web browser as shown in FIG. 1. The upper frame (500) contains a title and other high-level items of information and links. Below the upper frame (500), the left frame (502) contains a navigation bar to display links to information units. Once a link is selected, the appropriate information unit is displayed in the right bottom frame (504). In this example, in order to assist users to find information easily, the information units are divided into various categories. Referring to the navigation bar (502), the category "Tasks" contains information units describing how to perform specific activities. The category "Concepts" contains information units detailing background information of product features and the category "Reference" contains information units with tabular or diagrammatic information.

When using an information center such as the one in FIG. 5A, only a single information unit can be displayed at a time in the right bottom frame (504). If another new information unit is to be displayed, the first is discarded and is replaced completely by the new information unit. Frequently, it will be necessary to navigate to the new information unit using the navigation tree in the navigation bar (502), whereby the navigation tree can be opened to a given level and closed to a given level. Therefore, several mouse clicks or the equivalent may be required to move from an information unit in one category to an information unit in another category. Subsequently, if the user wishes to return to the first information unit, several further mouse clicks may be required to re-establish the navigation tree. Alternatively navigation could occur by using the mouse to click on hyperlinks displayed in the right bottom frame (504). Also, in FIG. 5A, to the left of each category, an icon (506, 508, 510, 512) containing a square is displayed, to indicate that further sub-categories are contained within the top-level category. It should be understood that the term icon also covers graphic symbols such as tabs and buttons.

Figure 5B:
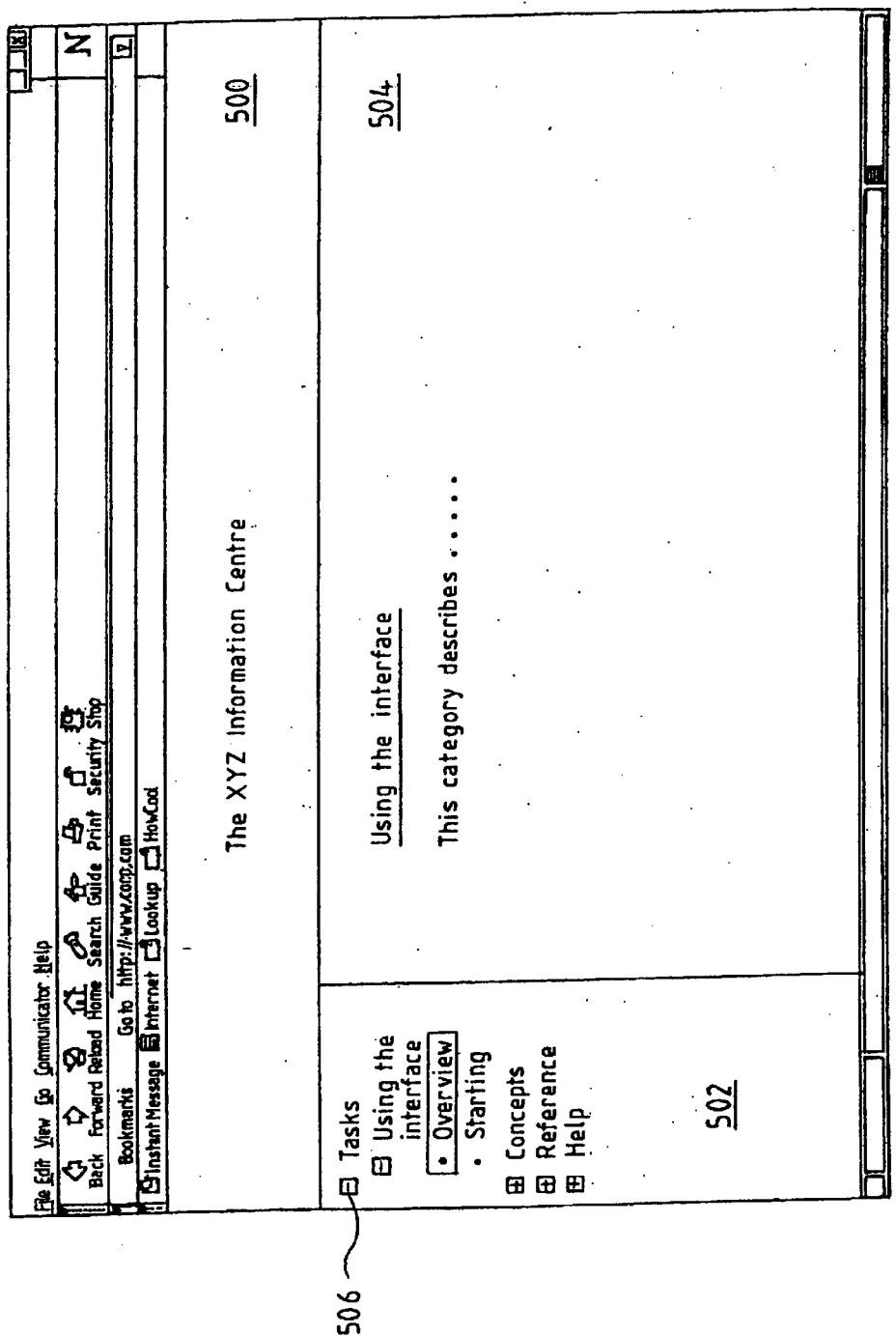
FIG. 5B shows the results of navigation operations performed on the information center of FIG. 5A.
Figure 5C:
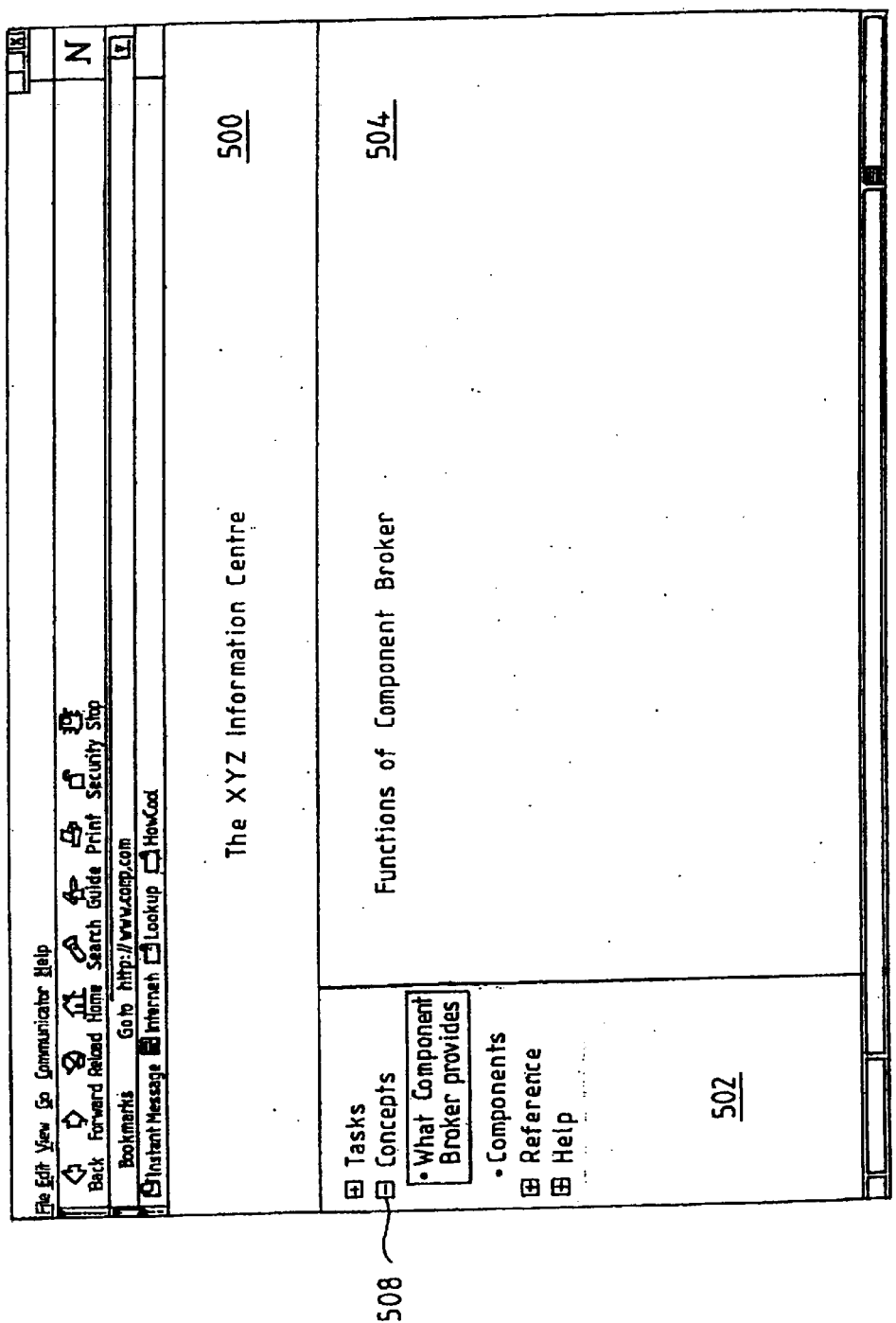
FIG. 5C shows the results of further navigation operations performed on the information center of FIG. 5A.
Figure 5D:
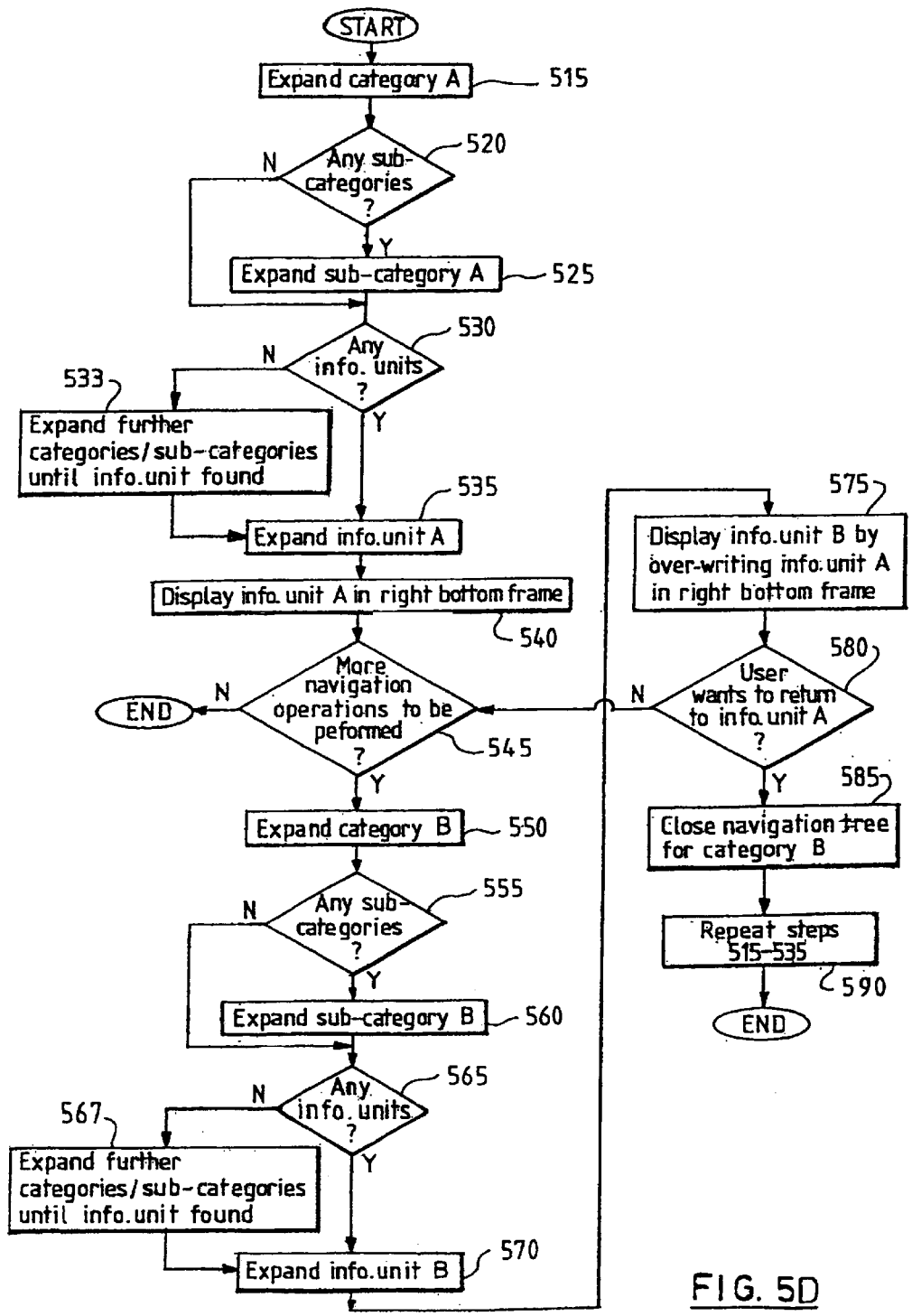
FIG. 5D is a flow chart showing the operational steps involved in performing the navigation operations of FIGS. 5B and 5C.

Referring to FIGS. 5B and 5C, which are used in conjunction with the flow chart of FIG. 5D, once a user clicks on the icon (506) containing a square to expand (step 515) the category "Tasks", further sub-categories are displayed. Subsequently the user clicks to expand (step 525) one of these sub-categories, namely, "Using the Interface" and then clicks to expand (step 535) an information unit, namely, "Overview", contained in this sub-category. The information unit is now displayed (step 540) in the right bottom frame (504). If there are no sub-categories for selection, under the top-level category (step 520), the user may click directly on an information unit. However, if there are no information units for selection (step 530), the user has the option to click (step 533) either on a different top-level or sub-category, in order to continue with the navigation operations.

Supposing the user now wants to display an information unit contained within another top-level category by performing (step 545) further navigation operations. In FIG. 5C, the user expands (step 550) the "Concepts" category by clicking on the icon (508) containing a square and this operation causes the navigation tree under category "Tasks" to be closed. It is now possible to navigate to an information unit under category "Concepts", for example, by directly clicking (step 570) on the "What Component Broker provides" information unit. This is the consequence of a negative result to step 555 and a positive result to step 565.

As in FIG. 5C, if there are no sub-categories for selection under the top-level category (step 555), the user may click directly (step 570) on an information unit. However, if there are no information units for selection (step 565), the user has the option to click (step 567) either on a different top-level or sub-category, in order to continue with the navigation operations.

The information unit "What Component Broker provides", is now displayed (step 575) by replacing the "Overview" information unit in the right bottom frame (504). If the user does not want to return to the original "Overview" information unit (step 580), and no further navigation operations are to be performed (step 545), the navigation process ends.

However, if the user wants to return to the original "Overview" information unit contained within "Tasks"; "Using the Interface"; (step 580), the user is required to first close (step 585) the "Concepts" navigation tree. The user then re-expands the "Tasks" navigation tree and thirdly navigates down the "Tasks" navigation tree once more (step 590). Obviously, this is a tedious and time-consuming process, which can be frustrating for the user.

In a preferred embodiment of the present invention, the navigation process is simplified by implementing a two-dimensional navigation structure rather than a one-dimensional navigation structure. That is, each category of information has its own navigation tree and selection of categories is moved from a one-dimensional navigation bar to a second dimension, namely, via tabs in the upper frame. Each category of information has an associated tab. Alternatively a three-dimensional navigation structure could be implemented although this structure may be an overhead and may also be too complex.

Additionally, when a user closes a top-level category, the state of the sub-categories within the navigation tree is stored, that is, which sub-categories are in an expanded state and which are in a closed state. The state information is stored on the client machine so that when the top-level category is re-expanded, the navigation tree for that top-level category is restored to its previous state and the information unit that was last displayed is also restored. This is advantageous, in that it is now possible to switch between information units held within different categories with only a single mouse click.

Figure 6A:
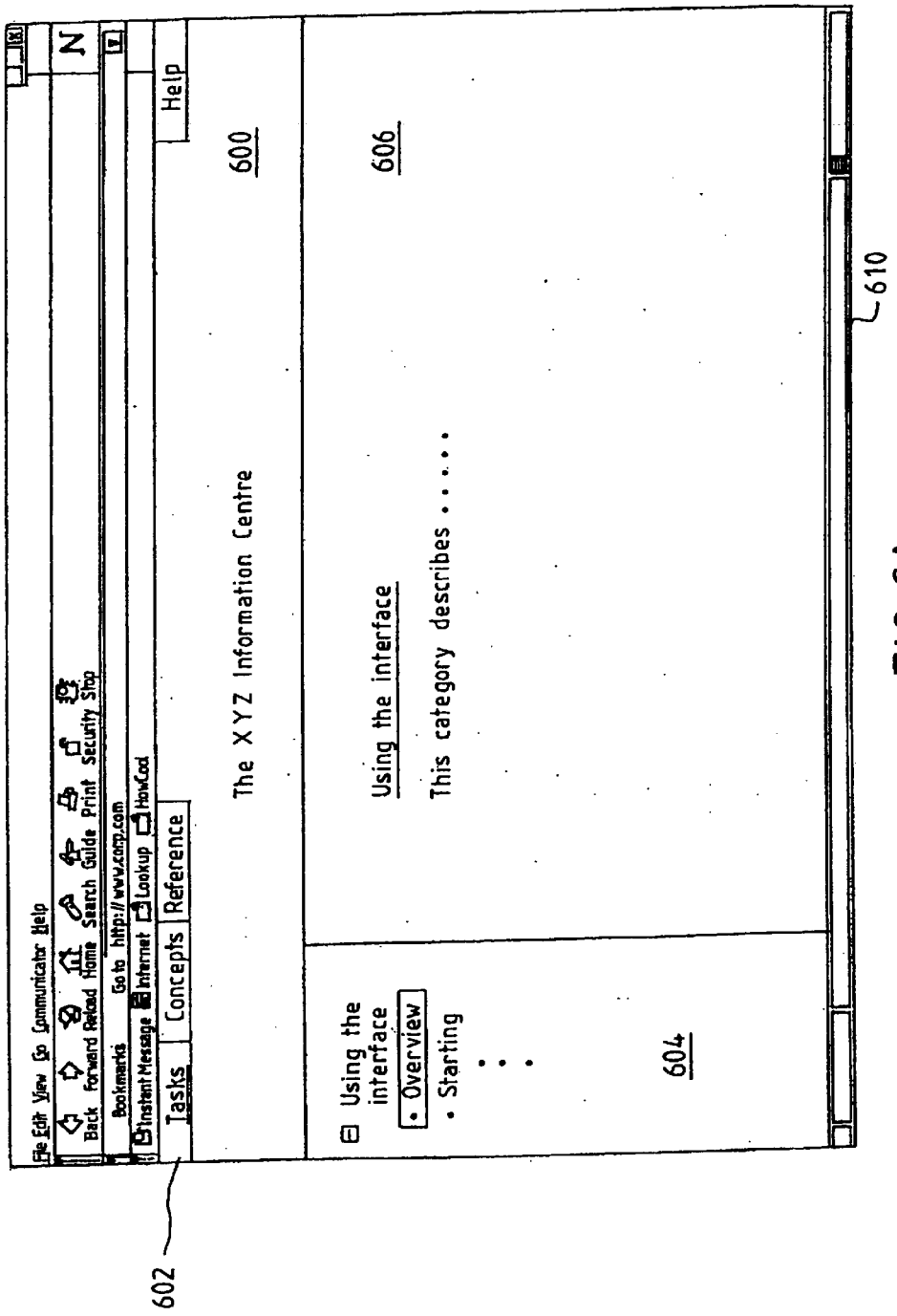
FIG. 6A shows the results of navigation operations performed on an information center, according to the present invention.
Figure 6B:
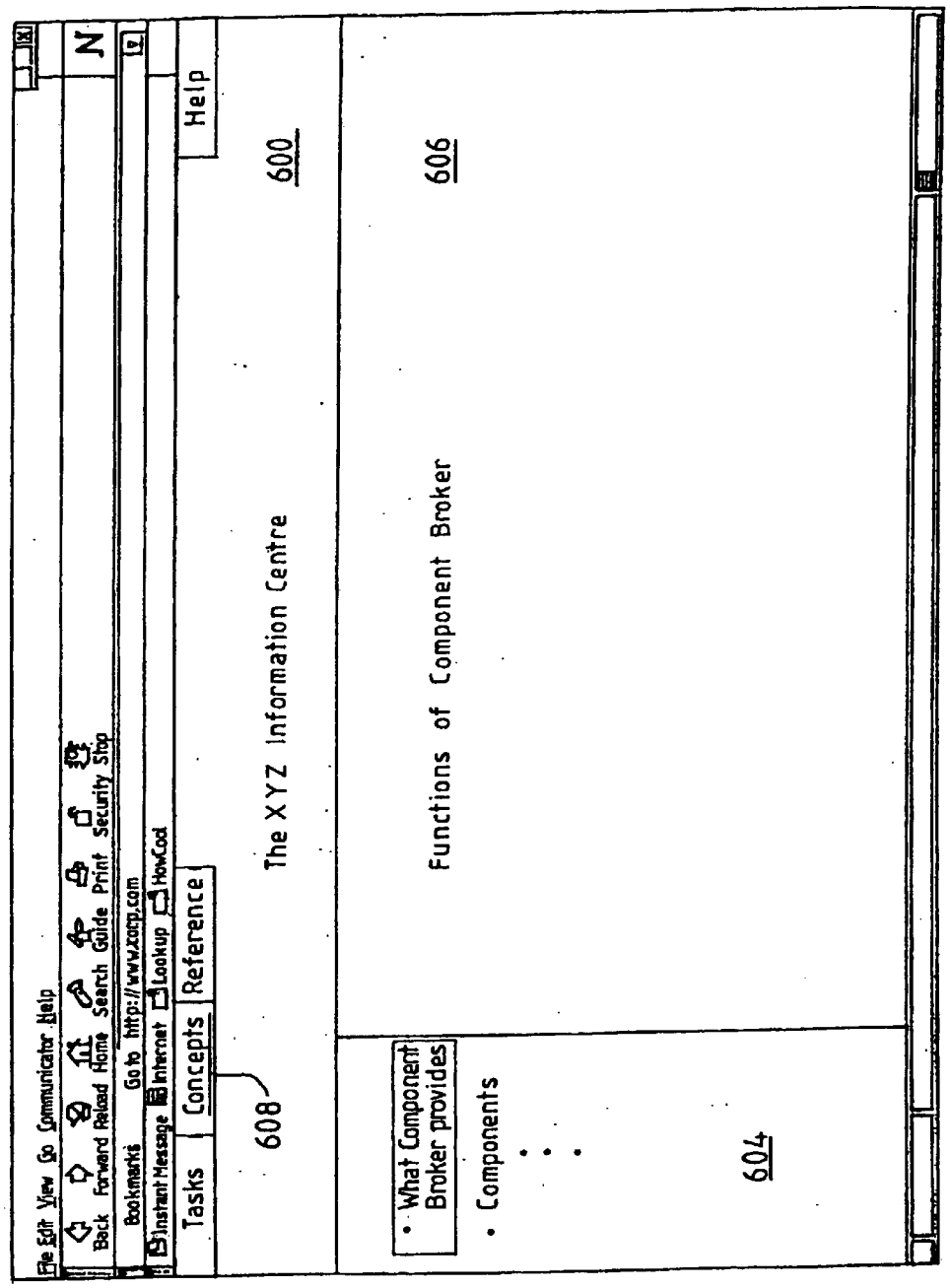
FIG. 6B shows the results of further navigation operations performed on an information center, according to the present invention.
Figure 6C:
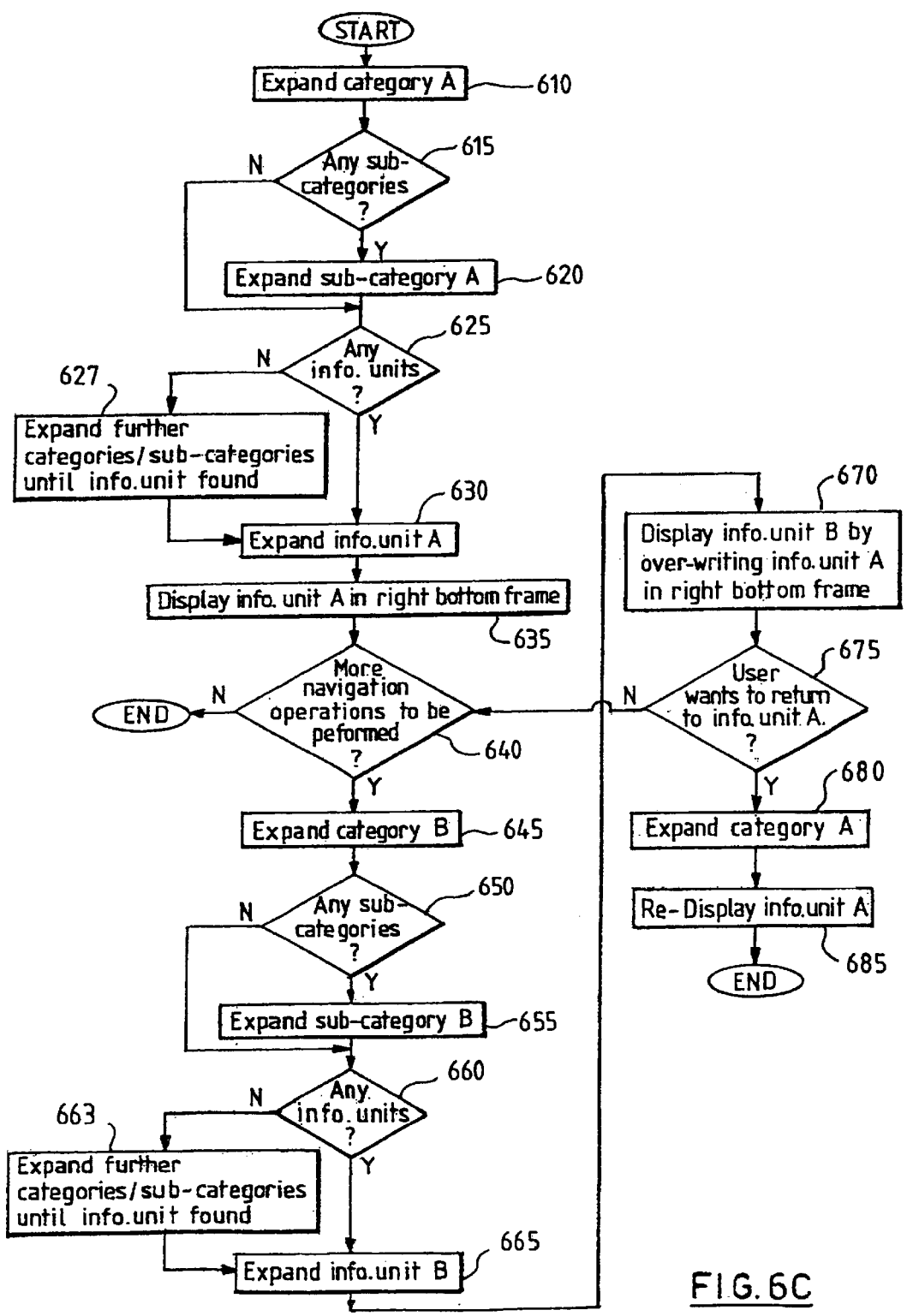
FIG. 6C is a flow chart showing the operational steps involved in performing the navigation operations of FIGS. 6A and 6B, according to the present invention.

As an example, referring to FIGS. 6A and 6B, to be used in conjunction with FIG. 6C, a user first clicks (step 610) on the tab (602) for category "Tasks", in the upper frame (600). The user then navigates down the navigation tree for "Tasks", via steps 615 through 630, to an information unit, namely, "Overview", which is displayed (step 635) in the right bottom frame (606). If further navigation operations are to be performed (step 640), in FIG. 6B, the tab (608) for category "Concepts" is clicked (step 645) on in the upper frame (600), for example. The user navigates down this tree, via steps 650 through 665, to an information unit, namely, "What Component Broker provides". This is displayed (step 670) by replacing the "Overview" information unit in the right bottom frame (606). If the user does not want to return to the original "Overview" information unit (step 675), and no further navigation operations are to be performed (step 640), the navigation process ends.

In the preferred embodiment of the present invention, if the user wishes to return to information unit "Overview" (step 675), the user only has to use a single mouse click on the tab (602) for category "Tasks", in order to re-select (step 680) that category. The information unit as shown in FIG. 6A is then re-displayed automatically (step 685).

The preferred embodiment of the present invention is implemented in the JavaScript programming language. (JavaScript is a trademark of Sun Microsystems Inc.) Specifically, information associated with each category is held as an item in a JavaScript array. A representation of the array (700) is shown in FIG. 7. An example of the array declaration and initialisation is shown in FIG. 8A.

For example, taking the category "Tasks", the following information is initially held in the array (700):

1. Text (720) associated with the category tabs in the upper frame (600) and text (730) to be displayed in a window status area (610) or a pop up window for example, when a mouse cursor is positioned over this category tab 2. A URL (740) associated with the HTML file used to build the navigation tree for "Tasks", whereby the navigation tree is displayed in the navigation bar (604)

3. A URL (750) associated with the information unit last displayed in the right bottom frame (606), whereby the information unit is contained within the category "Tasks".

The array (700) would therefore initially contain the following information for category "Tasks":

"Tasks"; "CICS task groups"; tasknav.html; taskhome.html;

In FIG. 8B, the tabs for the information categories are defined. Preferably, the id=attribute is used by a function that changes the colours of a category tab, depending on whether the tab is currently selected.

In this case, the switchColors function, as shown in FIG. 8C, uses the id=attribute. In FIG. 8B, the category="tab" attribute is used to obtain presentation information from a cascading style sheet. Style sheets are programmatic representations of the processing operations or transformations to be performed on input data to create an output with desired presentation characteristics. For example, presentation characteristics such as the size, weight and name of the font to be used can be described. In FIG. 8B, referring to the target="nav" attribute, "nav" is the JavaScript name of the left frame (604), which contains the navigation bar.

When a user wishes to switch from one category of information, for example "Tasks", to a new category, for example "Reference", he or she does so either by clicking on the "Reference" tab, or by using the "Tab" key to move to the "Reference" tab and then pressing the "Enter" key. In both cases, as shown in FIG. 8B, the onClick event handler associated with the tab, is invoked by the web browser. This in turn invokes the JavaScript function switchCategory, defined in FIG. 8C, and passes it an associated parameter. In this case the parameter is the index (categoryNumber) of the "Reference" category into the array of category definitions, namely, 2.

The switchCategory function first stores the URL associated with the currently displayed information unit. The URL is stored in the array item corresponding to the current category, in this example, "Tasks". The switchCategory function then sets the right bottom frame (606) to display the new information unit identified by the URL, that was either initially stored in the array (700) or was stored on a previous invocation of the switchCategory function on leaving the category "Reference". Optionally, the switchCategory function may then indicate which category the user is currently viewing, by changing the colours of the previous and current tabs. Finally the switchCategory function stores the index of the new category, in this case "Reference", as the current category.

In FIG. 8B, on return from the function switchCategory, the web browser uses the values of the href=and target= attributes from the anchor tag of the new category to invoke the HTML file that builds the navigation tree in the navigation bar (604), for that category.

The present invention could also be applied to web sites other than to a web site for an information center containing detailed product information. For example, in a corporate web site, category "Products" would contain information units describing various product lines, category "Services" would describe the consultancy services offered, category "Support" would describe any after-sales services and category "About the company" would provide general information.

What is claimed is:

1. A method of retrieving information by navigating within a web browsing session, in which the information is represented by a plurality of information units and stored in a hierarchical tree comprising a root node, a plurality of top-level child a nodes representing information categories, and a plurality of leaf nodes each having, said method comprising the steps of:
  displaying a first information unit in an information space, said first information unit associated with said root node;
  performing navigation operations from the root node, by expanding a first child node of said plurality of top-level child nodes, traversing said plurality of leaf nodes and selecting a first leaf node of said plurality of leaf nodes;
  in response to said selecting step, displaying a second information unit first of leaf in said information space, said second information unit associated with said first leaf node of said plurality of leaf nodes;
  storing said first information unit;
  repeating each of said performing step, said displaying step and said storing step, for a second child node of said plurality of top-level child nodes whereby a said second information unit is stored, and a third information unit is displayed in said information space, said third information unit associated with a second leaf node of said plurality of leaf nodes;
  re-expanding said first child node of said plurality of top-level child nodes, and
  in response to said re-expanding step, automatically re-displaying said second information unit in said information space.

2. A method as claimed in claim 1, wherein said nodes are expanded by clicking on an associated icon.

3. The method as claimed in claim 2, wherein said second information unit is re-displayed by clicking once on an associated icon of said first of said plurality of top-level child nodes.

4. The method as claimed in claim 1, wherein said root node and each of said plurality of top-level child nodes has an associated navigation tree, whereby said navigation tree has information links that are expandable from a closed to an expanded state.

5. The method as claimed in claim 4, wherein the state of a navigation tree is stored upon closing of said navigation tree and the state of said navigation tree is restored upon opening of said navigation tree.

6. The method as claimed in claim 4, wherein the state of a navigation tree is stored on a client computer.

7. The method as claimed in claim 1, wherein data associated with said root node and each of said plurality of top-level child nodes is stored as items in an array.

8. The method as claimed in claim 7, wherein, for one of said nodes, said data comprises: text associated with said one of said nodes; a network address associated with a navigation tree for said one of said nodes, and a network address associated with a first associated information unit returned by traversing through said one of said nodes.

9. The method as chimed in claim 1, wherein said information is organised as an information center of a collection of online documents, whereby said information center comprises an upper frame containing associated icons, a left frame containing a navigation tree and a right bottom frame containing said information space.

10. The method as claimed in claim 9, wherein said information center is structured in two dimensions.

11. The method as claimed in claim 2, wherein a selected associated icon changes colour.

12. The method as claimed in claim 1, wherein presentation characteristics of an associated information unit are obtained from a style sheet.

13. A computer program product stored on a computer readable storage medium comprising instructions which when executed on a computer cause said computer, in response to user inputs, to carry out the method as claimed in claim 1.

14. A client computer for retrieving information by navigating within a web browsing session, whereby said client is connected via a network to a server in which the information is represented by a plurality of information units and stored in a hierarchical tree comprising a root node, a plurality of top-level child nodes representing information categories, and a plurality of leaf nodes, said client computer comprising:
  means for displaying a first information unit in an information space, said first information unit associated with said root node;
  means for performing navigation operations from the root node, by expanding one child node of said plurality of top-level child nodes, traversing said plurality of leaf nodes and selecting one leaf node of said plurality of leaf nodes;
  means, responsive to said selection of said one leaf node of said plurality of leaf nodes, for displaying a second information unit of in said information space, said second information unit associated with said one leaf node of said plurality of leaf nodes;
  means for storing said second information unit;
  means, responsive to re-expansion of said one child node of said plurality of top-level child nodes, for automatically re-displaying said second information unit in said information space, notwithstanding an intervening expansion by said means for performing navigation of a second child node of said plurality of top-level child nodes.

15. The client computer as claimed in claim 14, wherein said nodes are expanded by clicking on an associated icon.

16. The client computer as claimed in claim 15, wherein said second information unit is re-displayed by clicking once on an associated icon of said first one child node of said plurality of top-level child nodes.

17. The client computer as claimed in claim 14, wherein said root node and each child node of said plurality of top-level child nodes has an associated navigation tree, whereby said navigation tree has information links that are expandable from a closed to an expanded state.

18. The client computer as claimed in claim 17, wherein the state of a navigation tree is stored upon closing of said navigation tree and the state of said navigation tree is restored upon opening of said navigation tree.

19. The client computer as claimed in claim 14, wherein data associated with said root node and each child node of said plurality of top-level child nodes is stored as items in an array.

20. The client computer as claimed in claim 19, wherein, for one of said nodes, said data comprises: text associated with said one of said nodes; a network address associated with a navigation tree for said one of said nodes, and a network address associated with a first associated information unit returned by traversing through said one of said nodes.

21. The client computer as claimed in claim 14, wherein said information is organised as an information center of a collection of online documents, whereby said information center comprises an upper frame containing associated icons, a left frame containing a navigation tree and a right bottom frame containing said information space.

22. The client computer as claimed in claim 21, wherein said information center is structured in two dimension.

23. The client computer as claimed in claim 15, wherein a selected associated icon changes colour.

24. The client computer as claimed in claim 14, wherein presentation characteristics of an associated information unit are obtained from a style sheet.

25. A system for retrieving information by navigating within a web browsing session, comprising:
- a server having means for storing the information in a hierarchical tree comprising a root node, a plurality of top-level child nodes representing information categories, and a plurality of leaf nodes, the information represented by a plurality of information units, whereby said server is responsive to receiving inputs from a client to provide an information unit on selection of one of said nodes, and
- a client computer for retrieving information by navigating within a web browsing session, whereby said client computer is connected via a network to said server, said client computer comprising:
- means for displaying a first information unit in an information space, said first information unit associated with said root node;
- means for performing navigation operations from the root node, by expanding one child node of said plurality of top-level child nodes, traversing said plurality of leaf nodes and selecting one leaf node of said plurality of leaf nodes;
- means, responsive to said selection of said one leaf node of said plurality of leaf nodes, for displaying a second information unit in said information space, said second information unit associated with said one leaf node of said plurality of leaf nodes;
- means for storing said associated second information unit;
- means, responsive to re-expansion of said one child node of said plurality of top-level child nodes, for automatically re-displaying said second information unit in said information space, notwithstanding an intervening expansion by said means for performing navigation of a second child node of said plurality of top-level child nodes.

26. The system as claimed in claim 25, wherein said nodes are expanded by clicking on an associated icon.

27. The system as claimed in claim 26, wherein said second information unit is re-displayed by clicking once on an associated icon of said one child node of said plurality of top-level child nodes.

28. The system as claimed in claim 25, wherein said root node and each child node of said plurality of top-level child nodes has an associated navigation tree, whereby said navigation tree has information links that are expandable from a closed to an expanded state.

29. The system as claimed in claim 28, wherein the state of a navigation tree is stored upon closing of said navigation tree and the state of said navigation tree is restored upon opening of said navigation tree.

30. The system as chimed in claim 28, wherein the state of a navigation tree is stored on said client computer.

31. The system as claimed in claim 25, wherein data associated with said root node and each child node of said plurality of top-level child nodes is stored as items in an array.

32. The system as claimed in claim 31, wherein, for one of said nodes, said data comprises: text associated with said one of said nodes; a network address associated with a navigation tree for said one of said nodes, and a network address associated with a first associated information unit returned by traversing through said one of said nodes.

33. The system as chimed in claim 25, wherein said information is organised as an information center of a collection of online documents, whereby said information center comprises an upper frame containing associated icons, a left frame containing a navigation tree and a right bottom frame containing said information space.

34. The system as claimed in claim 33, wherein said information center is structured in two dimensions.

35. The system as claimed in claim 26, wherein a selected associated icon changes colour.

36. The system as claimed in claim 25, wherein presentation characteristics of on associated in formation unit is are obtained from a style sheet.

* * * * *